United States Patent [19]

Shimazaki

[11] Patent Number: 4,740,801

[45] Date of Patent: Apr. 26, 1988

[54] NON-IMPACT PRINTING APPARATUS

[75] Inventor: Takashi Shimazaki, Yokohama, Japan

[73] Assignee: Kabushiki Kaisha Toshiba, Kawasaki, Japan

[21] Appl. No.: 919,241

[22] Filed: Oct. 15, 1986

[30] Foreign Application Priority Data

Nov. 20, 1985 [JP] Japan ................................ 60-260459

[51] Int. Cl.$^4$ ............................................ G01D 15/16

[52] U.S. Cl. .............................. 346/140 R; 400/202.2; 400/197; 346/1.1

[58] Field of Search ................ 346/76, 75, 140, 153.1; 400/196, 202.2, 197, 202

[56] References Cited

U.S. PATENT DOCUMENTS

| | | | |
|---|---|---|---|
| 3,834,301 | 9/1974 | Croquelois et al. | 101/1 |
| 4,298,786 | 11/1981 | Marciniec | 219/216 |
| 4,387,384 | 6/1983 | Sue | 346/140 R |
| 4,401,881 | 8/1983 | Saito | 219/216 |
| 4,506,272 | 3/1985 | Arai | 346/76 PH |
| 4,543,589 | 9/1985 | Terasawa | 346/140 R |
| 4,561,789 | 12/1985 | Saito | 400/120 |
| 4,562,444 | 12/1985 | Nagashima et al. | 346/76 PH |
| 4,573,059 | 2/1986 | Shinma et al. | 346/76 PH |
| 4,608,577 | 8/1986 | Hori | 346/140 R |
| 4,630,075 | 12/1986 | Hori | 346/140 R |

FOREIGN PATENT DOCUMENTS

| | | |
|---|---|---|
| 6019550 | 7/1983 | Japan . |
| 60-71260 | 4/1985 | Japan . |
| 2145974 | of 1985 | United Kingdom . |

*Primary Examiner*—H. Broome
*Assistant Examiner*—Mark Reinhart
*Attorney, Agent, or Firm*—Cushman, Darby & Cushman

[57] ABSTRACT

A non-impact printing apparatus in which an ink carrier film is formed to have a plurality of holes or recesses, the holes are filled with ink, and then the film filled at the holes with the ink is selectively heated by a thermal printing head according to image information to generate bubbles within the ink in the heated holes and thus to eject the ink onto a printing paper under influence of the pressure of the generated bubbles. The effective diameter of each of hole provided on the ink carrier film is less than the thickness thereof thus improving the image quality.

14 Claims, 7 Drawing Sheets

NON-IMPACT PRINTING APPARATUS

BACKGROUND OF THE INVENTION

This invention relates to a non-impact printing apparatus. More specifically, this invention relates to a thermal ink jet printing apparatus.

There have been proposed various printing systems ranging from impact types to non-impact types. Non-impact type printers, which provide less noise than the impact type printers, include electrophotographic, electrostatic, thermal and ink jet printers.

As an example of a non-impact printing apparatus, there is known a thermal ink jet printer which produces an image by using a thermal head and an ink carrier film having a plurality of holes or recesses. In a conventional apparatus of this type such as disclosed in Japanese Patent Disclosure No. 60-71260, an ink carrier film is disposed between a thermal head and a printing paper and is quickly heated to generate bubbles in the ink held in holes by the thermal head. The thermal head has a plurality of heating elements. In operation, a driving circuit provides a set of driving pulses according to the image to be printed and thus the selected heating elements are energized so that when the ink-filled holes reach the surface of the selected heating elements, the selected heating elements heat the holes to generate bubbles in them, whereby the air pressure of the generated bubbles causes ejection of the ink toward the printing paper.

In the printing apparatus mentioned above, however, as the ink in the holes is ejected toward the printing paper by the pressure of air bubbles generated in the ink, it is too difficult to precisely control the ejection of ink drops. As a result, the apparatus may not achieve high-quality recording. It is, therefore, considered to achieve high-quality recording by arranging the holes in an appropriate manner.

SUMMARY OF THE INVENTION

Accordingly, it is an object of the present invention to provide a non-impact printing apparatus which may improve the image quality.

Another object of the present invention is to provide a non-impact printing apparatus in which a high resolution is achieved.

These and other objects are achieved by providing an improved non-impact printing apparatus including means for disposing an ink carrier film opposite to a recording medium wherein said ink carrier film has a plurality of holes to receive ink therein and the diameter of the holes is less than the thickness of said ink carrier film, and means for selectively heating said ink carrier film in accordance with an image to be printed so as to eject the ink filled in the holes onto the recording medium.

In another aspect of the present invention, the above objects are achieved by providing an ink carrier film for carrying ink thereon used for a thermal ink jet printing device including means for disposing said ink carrier film opposite to a recording medium transported in a predetermined direction and means for selectively heating said ink carrier film in accordance with an image to be printed so as to eject ink carried on the surface of said ink carrier film onto the recording medium, said ink carrier film comprising an elongated thin film, adapted to be reciprocated along said predetermined direction, having a plurality of holes passed through said thin film, wherein the diameter of each of the holes is less than the thickness of said thin film, so that the ink is held in the holes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, in which.

DETAILED DESCRIPTION OF THE PREFERRED EMBODIMENTS

Figure 1:
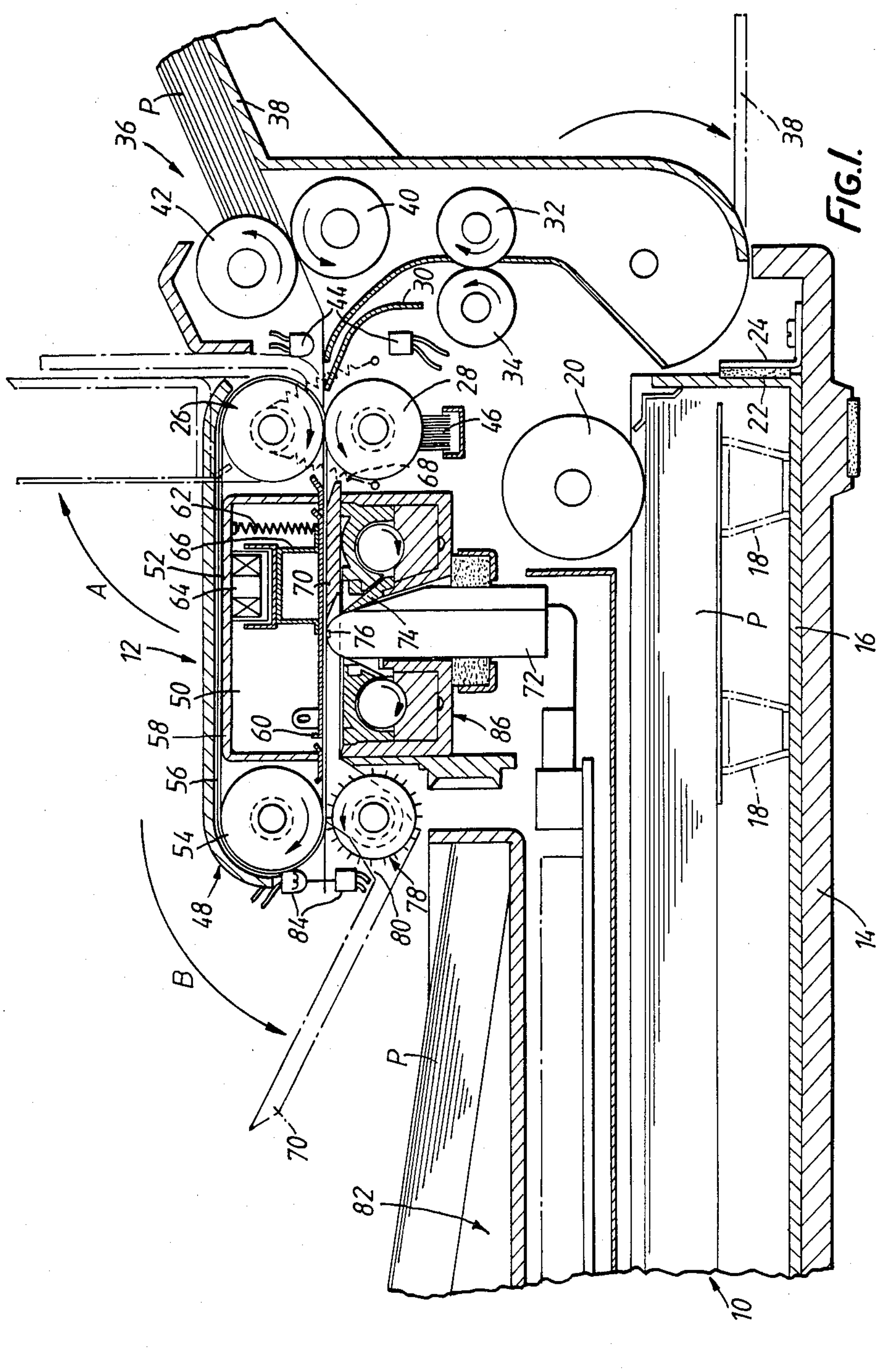
FIG. 1 is a front view of the inside of a thermal ink jet printer according to the present invention.

FIG. 1 shows the thermal ink jet printer for producing an image on a recording medium according to the present invention.

Referring now to FIG. 1, the thermal ink jet printer comprises a feeder unit 10 and a printer unit 12 which are enclosed in a casing 14. A paper feed cassette 16, in which recording papers P are stored, is mounted inside casing 14. The paper stack is urged upward by springs 18 so that the uppermost paper is always in contact with a feed roller 20. A rubber magnet 22 is provided on the side surface of cassette 16 so as to hold cassette 16 by magnetic force produced between magnet 22 and a magnetic plate 24 attached to casing 14. Recording papers P in cassette 16 are picked up due to the rotation of feed roller 20, and then are carried toward a pair of rollers 26 and 28 along a guide plate 30 by transporting rollers 32 and 34 rotating in contact with each other. Thus, paper P reaches the contact position of two rollers 26 and 28, which are stopped, so that paper P, taken from cassette 16, is aligned. Feeder unit 10 is also provided with a manual feed unit 36. Manual feed unit 36 may supply recording papers P set on a table 38 to rollers 26 and 28, which are stopped, by a feed roller 40 and a separating roller 42. Papers P are taken out one-by-one, starting with the lowermost paper set on table 38 and reach the contact position of two rollers 26 and 28.

A photodetector 44 is provided between rollers 40 and 42 and rollers 26 and 28 so as to detect the leading edge of paper P taken from cassette 16 or supplied from table 38. Photodetector 44 detects the leading edge of paper P, and after a predetermined period of time, rollers 26 and 28 start the rotation thereof. Thus, the skew of paper P may be corrected.

A brush 46 is mounted close to roller 28 to remove paper chips attached onto the surface of roller 28, thereby keeping the recording surface of paper P from contamination.

Printer unit 12 includes a paper handling device 48. Paper handling device 48 comprises an absorbing unit 50 and a belt pressing/releasing unit 52. Absorbing unit 50 has a roller 54, an absorbing belt 56 provided between rollers 26 and 54, and an air suction duct 58. Belt pressing/releasing unit 52 has a belt guiding plate 60, in which one end is supported for free rotation and the other end is always impressed downward by a spring 62, an electromagnetic coil 64 and a pressing plate 66 attached to plate 60. When coil 64 is activated, pressing plate 66 opposed to the surface of electromagnet 64 is moved so that belt guiding plate 60 is displaced against the tension of spring 62.

Roller 26 comes into pressure contact with roller 28 by a spring 68. For this arrangement, a thick paper may be received between rollers 26 and 28.

Paper handling device 48 may freely rotate around the axis of roller 26 in the direction of an arrow A shown in FIG. 1 so as to open a paper feed path along absorbing belt 56.

Thus, when rollers 26 and 28 start rotating, the leading edge of recording paper P is engaged between roller 28 and absorbing belt 56, thereby allowing paper P to be held under a proper pressure by the tension of spring 68.

A guide member 70 is opposed to plate 60. Also, a recording unit 72 is provided such that guide member 70 is located between plate 60 and unit 72. Guide member 70 is fixed to maintain paper P at a certain spacing with unit 72, so that paper P may move with a small gap of 0.2 mm from the surface of an ink carrier film 74 supported on a thermal head 76 of unit 72. It is very important to maintain the gap between recording paper P and film 74 for high-quality recording. Actually, the gap must be in the range of 0.1–0.3 mm to achieve a resolution of 8 lines/mm according to performance tests. It is, therefore, quite reasonable that a flexible thin film having a thickness of 0.1–0.3 mm may be used for guide member 70.

Also, guide member 70 has a knife-shaped edge toward thermal head 76 and a hydrophobic guiding surface so that the expansion and leakage of ink is surely prevented.

Ink carrier film 74 consists of a thin film made of polymide photo-etched to have a plurality of holes whose diameter lies in the range of 25–30 um. The guiding surface of film 74 is thinly coated with Teflon, thereby providing film 74 with hydrophobic property. Thus, any deposit of ink on the surface of film 74 may be completely cleared by scraping the deposited ink.

The surface of thermal head 76 and the surface of film 74 toward thermal head 76 are coated with about 3 um thick siloxane derivative for wear resistance.

As the leading edge of paper P further advances, it is recieved between roller 54 and a discharge roller 78 having a needle portion 80. The recording side of paper P is supported at a spot by needle portion 80 so as not to disturb the wet picture recorded on paper P.

Paper P is prevented from contacting the surface of film 74 when the leading or trailing edge of paper P is located in the vicinity of thermal head 76. This is accomplished by allowing electromagnetic coil 64 to be energized to attract belt guiding plate 60 upward so that the leading or trailing edge of paper P moves apart from the surface of fllm 74.

Thus, paper P may advance through paper handling device 48 without contacting film 74 or contamination, and is discharged onto a tray 82. When paper P is discharged, the trailing edge thereof is detected by a photodetector 84.

Recording unit 72 comprises a film cartridge 86 containing film 74 therein. Film cartridge 86 is easily installed into or removed from recording unit 72. For this operation, paper handling unit 48 may be rotated in the direction of arrow A, and also guide member 72 may be rotated in the direction of an arrow B shown in FIG. 1.

Figure 2:
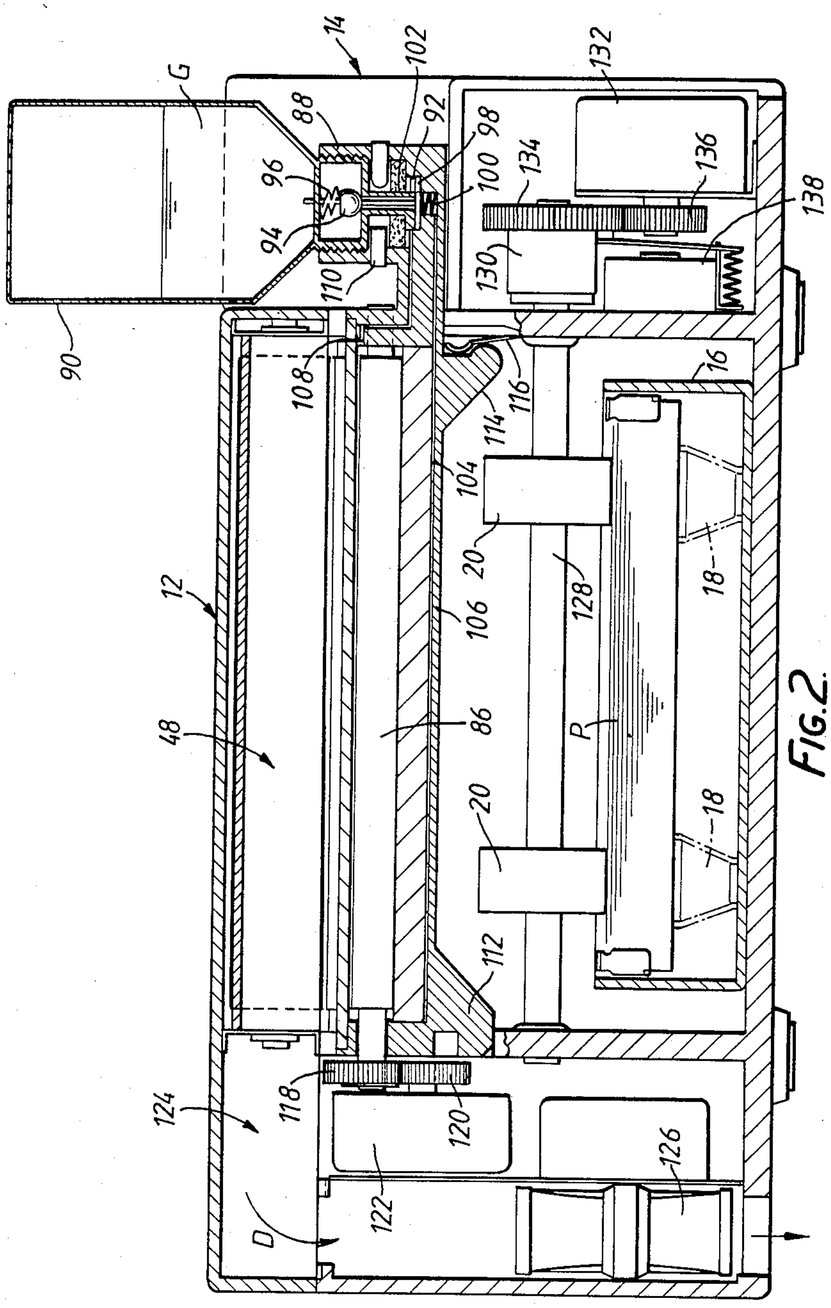
FIG. 2 is a side view of the inside of the thermal ink jet printer shown in FIG. 1.

Referring now to FIG. 2, an ink supply portion 88 is provided on the side of film cartridge 86. An ink vessel 90 contains ink C therein and is screwed into ink supply portion 88. A transparent ink supply tube 92 is provided on the bottom of vessel 90. Ink supply tube 92 is blocked by a valve 94 which is always urged downward by a spring 96. When vessel 90 is mounted on ink supply portion 88 of film cartridge 86, ink supply tube 92 forces down a valve 98 provided on ink supply portion 88 against the attractive force of a spring 100. On the other hand, valve 98 forces up a rod 102 so as to push valve 94 up. Thus, ink C flows out through ink supply tube 92; then ink C flows into a slender ink supply pipe 104 provided at the bottom of a casing 106 of cartridge 86.

When ink C is exhausted and its level decreases to below the tip of ink supply tube 92, air is introduced through a pipe 108 provided in cartridge 86. The air flows into ink vessel 90, thereby causing ink C to be supplied.

As ink C is consumed, the level of ink C further descends to tube 92. At that time, the exhaustion of ink C in vessel 90 may be detected by a photodetector 110. In response to the detection by photodetector 110, a display for vacancy of ink vessel 90 may be requested. Ink vessel 90 has a capacity of 100 cc enough to recording of 2,000–5,000 copies. Locking members 112 and 114 are provided at the bottom of casing 106 so as to hold film cartridge 86. Member 112 is inserted into a hole provided on casing 14 and member 114 is urged by a spring 116.

Driving gears 118 and 120 are provided on the other side of cartridge 86. Driving gears 118 and 120 are rotated by a motor 122 and thus ink carrier film 74 is reciprocated by the rotation of gears 118 and 120.

As shown in FIG. 2, an air duct 124 is provided in casing 14 and is connected to air suction duct 58 of absorbing unit 50 so as to absorb paper P onto absorbing belt 56. Also, a fan 126 is provided in air duct 124 to produce air stream as shown by an arrow D in FIG. 2.

As mentioned above, feeder unit 10 includes feed roller 20. Feed roller 20 is provided on a shaft 128 which is connected to a spring clutch 130. Spring clutch 130 is connected to a motor 132 through gears 134 and 136. The rotation of motor 132 is transmitted to shaft 128 according to the operation of spring clutch 130 which is turned off or on by a solenoid 138 via gears 134 and 136.

Figure 3:
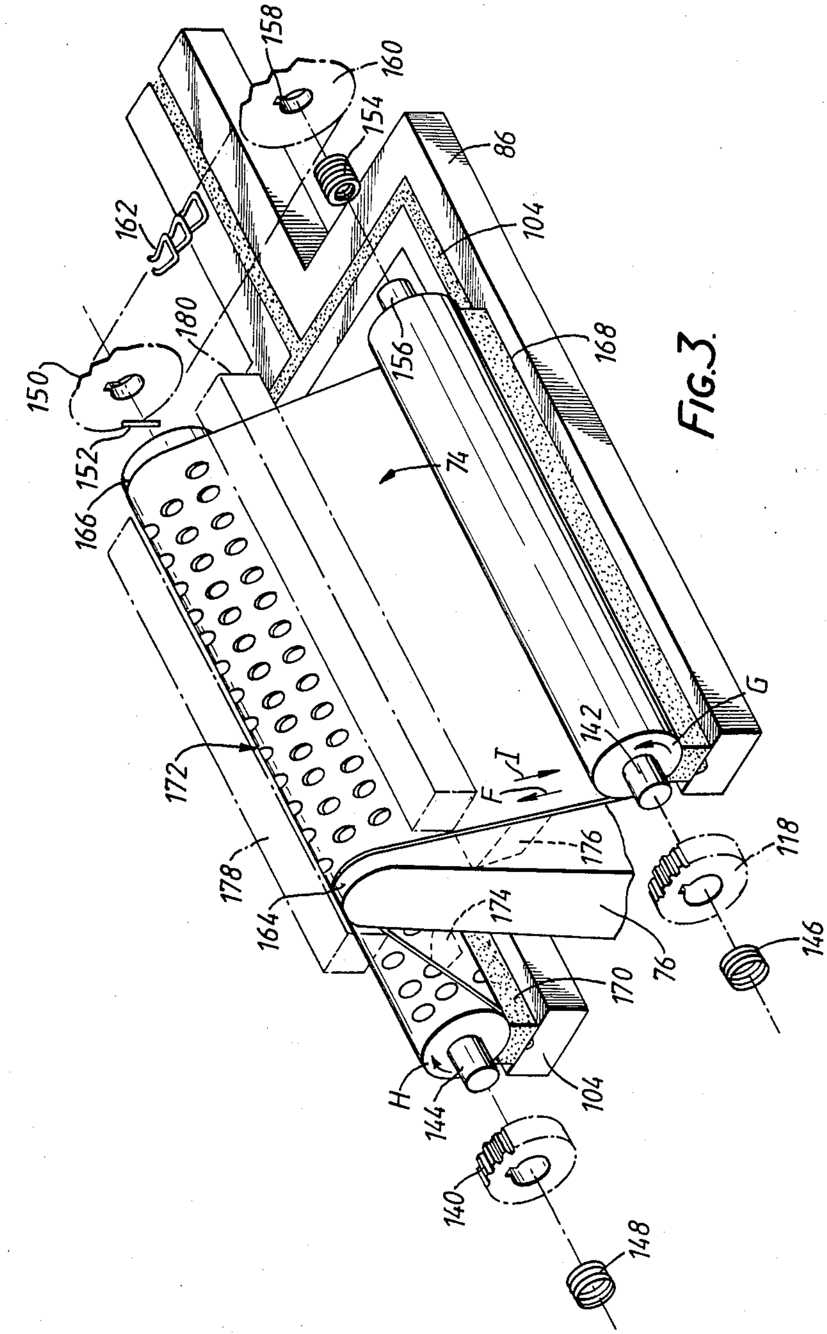
FIG. 3 is a perspective view of an ink carrier film cartridge used for the thermal ink jet printer shown in FIG. 1.

FIG. 3 shows film cartridge 86. Referring now to FIG. 3, ink carrier film 74 moves up or down in response to the rotation of motor 122. Motor 122 may rotate in the clockwise or counterclockwise direction. The rotation of motor 122 is transmitted to gear 118 and a gear 140 through gear 120. Gears 118 and 140 are attached to driving shafts 142 and 144 for winding ink carrier film 74 thereon via coill springs 146 and 148, respectively.

When driving gear 120 rotates clockwise, film driving gear 140 rotates clockwise. As one end of counterclockwise-wound spring 148 fitted on shaft 144 is engaged with gear 140, the clockwise rotation of gear 140 provides the rotation to transport film 74. At that time, gear 118 engaged with gear 120 is also rotated clockwise. For this clockwise rotation, however, clockwise-wound spring 146 is loosened relatively from shaft 142. Thus, there occurs slip between gear 118 and shaft 142 so that ink carrier film 74 moves in the direction of an arrow F as shown in FIG. 3. Further, a rudder wheel 150 is fixed to shaft 144 by a pin 152. A counterclockwise-wound torsion spring 154 is disposed at the end of shaft 142 with its end engaged in a clamp 156 of shaft 142. The other end of spring 154 is engaged with a dent 158 of a rudder wheel 160. A rudder chain 162 is provided between wheels 150 and 160. Torsion spring 154 is properly twisted so that shaft 142 is urged to rotate in the direction of an arrow G and shaft 144 is urged to rotate in the direction of an arrow H. Accordingly, the torsion force of spring 154, i.e., a proper tension due to spring 154 may be applied to film 74.

When driving gear 120 rotates counterclockwise, spring 146 is wound around shaft 142. Thus, film 74 moves downward. Film 74 reciprocates in response to the direction of the rotation by gear 120 and is guided along side guiding members 164 and 166 provided at both ends of thermal head 76.

When ink C flows into ink supply pipe 104, ink C soaks into ink coating members 168 and 170 made of felt. Ink C is seized between fibers of felt so as to prevent ink C from leaking to outside film cartridge 86. As film 74 comes in contact with members 168 and 170, ink C is applied to film 74 by members 168 and 170. The applied ink is received in a plurality of holes or recesses 172 provided on film 74.

Continuous recording is achieved without using an endless ink carrier film, because film 74 may reciprocate for recording. Ink scrapers 174, 176, 178 and 180 are located such that, as shown in FIG. 3, they are arranged staggeringly with respect to the position where each of them comes in contact with the surface of film 74.

When film 74 is fed in the direction of an arrow I, ink C is received in holes 172 at ink coating member 170. During the transportation of film 74, film 74 contacts scrapers 174 and 178 so that film 74 is coated with a sufficient amount of ink C over the entire surface including holes 172 and a certain amount of excess ink is removed from the surface of film 74.

When film 74 is fed in the direction of arrow F, ink C is applied onto film 74 by ink coating member 168. During the transportation of film 74, film 74 contacts scrapers 176 and 180 so that film 74 is coated with a sufficient amount of ink C on the surface of film 74.

In a recording operation, the thermal ink jet printer is connected to an image information processing apparatus (not shown) so as to receive recording commands therefrom. In response to the command, film driving motor 122 is activated to transport film 74 for a certain period before roller 20 is rotated to take up paper P. Thus, the portion having holes 172 comes to thermal head 76. When paper P arrives at a predetermined position, film 74 is moved in synchronization with the leading edge of paper P in the direction of arrow F or I. Film 74 is fed at a feed speed of 20 mm/second or a half of the recording paper feed speed (40 mm/second).

Figure 4:
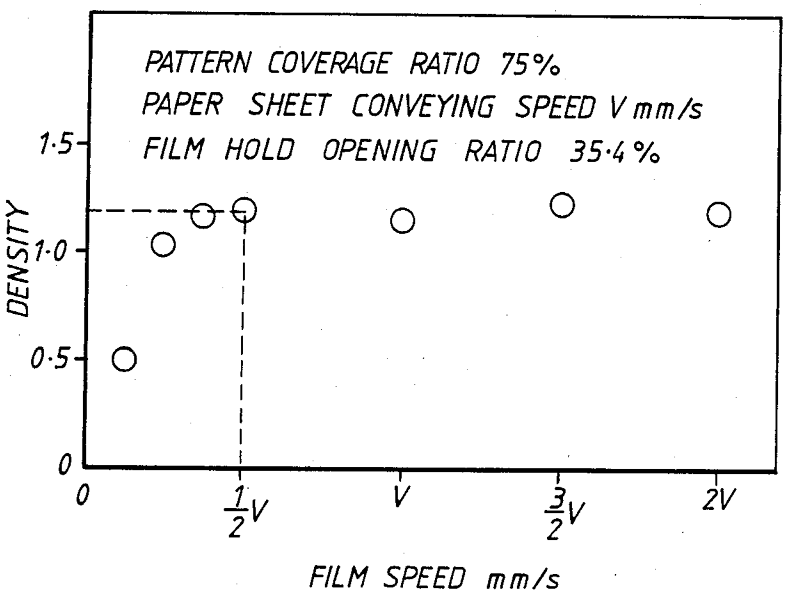
FIG. 4 is a graph showing the relationship between a film feed speed and an image density.

As shown in FIG. 4, image density (D) of a recorded picture is 1.0 or more, independently of the relative feed directions of film 74 and paper P when film 74 is fed at a speed of 1/4V or more.

The experiments mentioned above have been executed under conditions as follows:

Paper feed speed (V): 10–100 mm/second

Coverage ratio of the printing portion to the paper sheet: 75%

Hole opening ratio of hole area to film area: 35.4%

Figure 5:
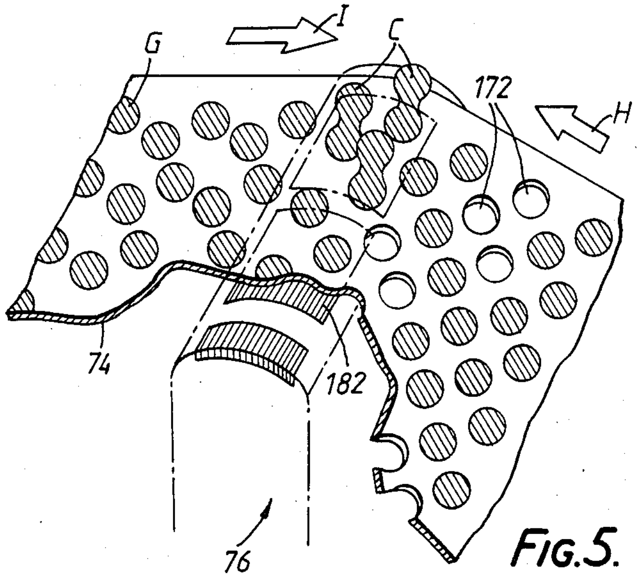
FIG. 5 is a perspective view showing the basic arrangement for the ink carrier film and a thermal head.

FIG. 5 shows the recording principle of the thermal ink printer.

Referring now to FIG. 5, ink C is received in holes 172 as film 74 passes through ink coating members 168 and 170 (see FIG. 3). Next, holes 172 of film 74 reach thermal head 76, on which a plurality of heating elements 182 are arranged, and driving signals are selectively applied to heating elements 182 according to image to be recorded. Each of heating elements 182 is opposed to a plurality of holes containing ink C so as to promote image density. Then, ink C received in each of holes 172 is heated rapidly so that air bubbles are produced in the heated ink to be jetted for recording.

When a recording operation is continuously achieved for an even-numbered paper fed from rollers 26 and 28, film 74 is fed in the direction of arrow F so as to apply ink C onto holes 172. After that, film 74 is moved reversely and then recording operation may be synchronized with the transportation of paper P.

For continuous recording operation on an odd-numbered paper, film 74 is fed in the direction of arrow I so as to apply ink C onto holes 172. After that, the trailing end of film 74 returns to heating elements 182 and film 74 is moved synchronously to the leading edge of paper P.

Thus, continous recording operations are achieved without endless films because film 74 may reciprocate for recording.

After completion of serial continuous recording, film 74 is fed at a speed lower than during a recording operation so that exhaustion of ink may be prevented.

Figure 6:
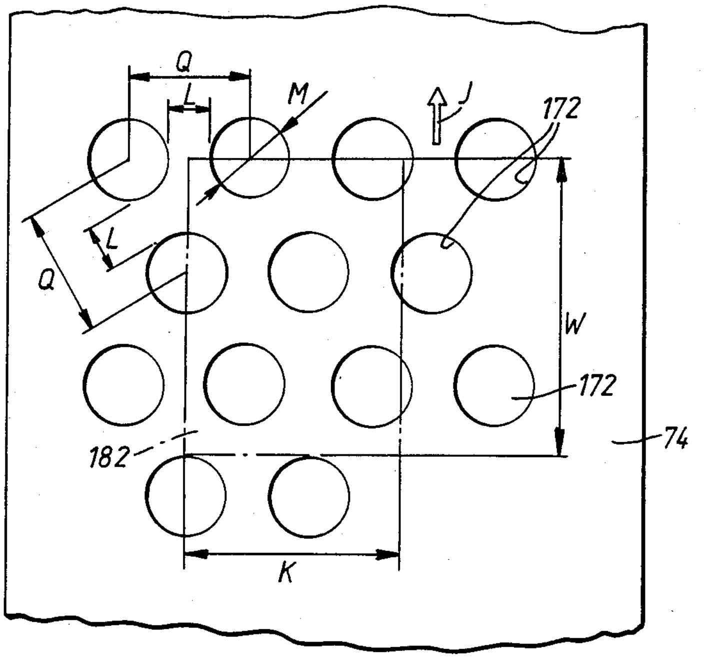
FIG. 6 is an enlarged plan view of the ink carrier film used for the thermal ink jet printer shown in FIG. 1.

FIG. 6 shows an arrangement for holes 172 on film 74, particularly, the relationship between the diameter and pitch of holes 172. Referring now to FIG. 6, an arrow J indicates the direction in which film 74 is transported. The lines connecting to the centers of holes 172 form a triangle whose one line is perpendicular to arrow J. References K and W indicate dimensions of each of heating elements 182, wherein each of them is about 100–125 um. Reference M indicates the diameter of each of holes 172, which is 8 um in the case of an illustrated example. Reference Q indicates the center-to-center distance of holes 172, which is about 15 um. Reference L indicates the maximum distance between adjoined two holes, which is about 15 um. According to results of experiments, it was required to satisfy conditions as follows:

(1) $K \geqq 2Q$ and $W \geqq 2Q+M$;

(2) M is in the range of 15–35 um; and (3) Q is in the range of 40–50 um.

Thus, high quality recording is obtained. Also, it was found that resolution of printed picture may depend on the relationship between the depth and the diameter of each of holes 172. For a resolution of 8 lines/mm, the diameter of each of holes 172 must be equal to or less than the depth of the holes or the thickness of film 74 where the holes extend through film 74.

Figure 7:
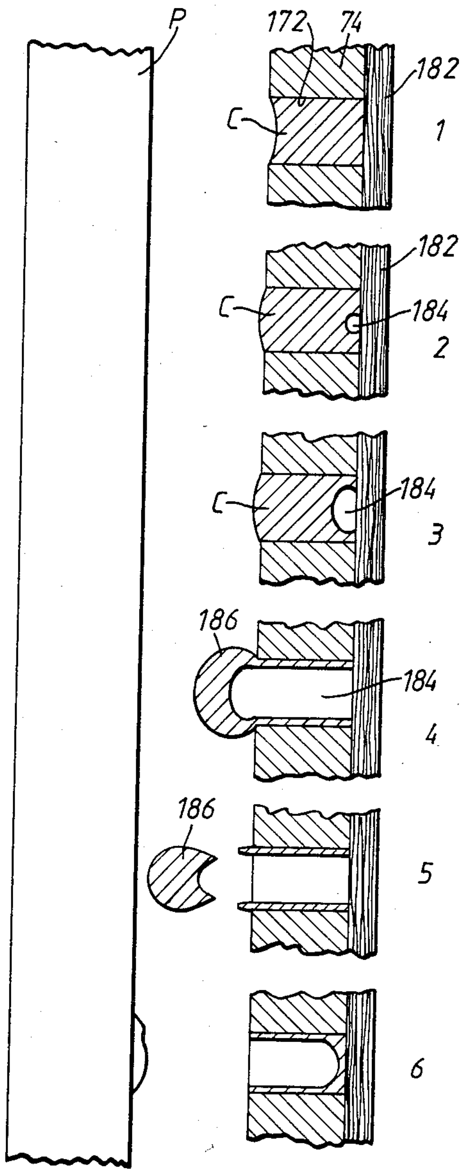
FIGS. 7 and 8 are sectional views for showing the state of ejected ink drops according to the present invention.
Figure 8:
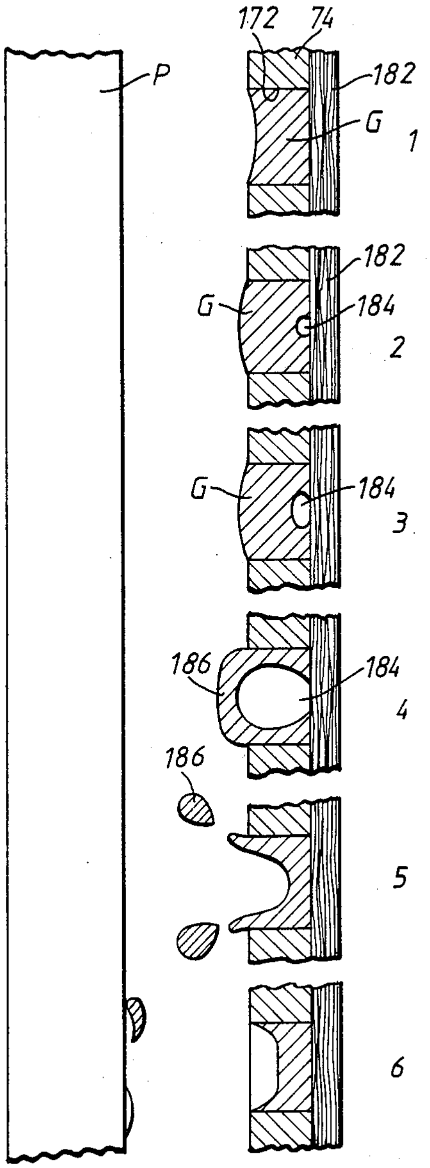

The reasons are illustrated in FIGS. 7 and 8.

Referring now to FIGS. 7 and 8, experiments were performed with a gap of 0.2 mm between paper P and film 74, paper feed speed of 40 mm/second, a film feed speed of 10 mm second and a hole diameter of 25 um for each of film thicknesses of 5 um, 15 um and 30 um. The printed image was not clear for a film thickness of 5 um, however, it became clearer with larger film thickness. The clearest image was obtained for a film thickness of 30 um.

FIG. 7 illustrates the state of ink jetted from film 74 whose hole diameter is smaller than the hole depth.

At the stage of reference (1), heating elements 182 have not yet been activated and ink C in hole 172 remains unchanged. At the stage of reference (2), heating elements 182 have now been activated so that bubbles 184 are produced. Then, bubbles 184 expand rapidly (reference (3)). At the stages of references (4) and (5), ink drops 186 are formed and jetted toward, paper P. Finally, ink drops 186 collide with and are absorbed into paper P (reference (6)).

As mentioned above, when the diameter of holes 172 is smaller than the film thickness, bubbles generated in holes 172 spread to the inner walls of holes 172 so as to force out ink drops 186 in a straight trajectory. As a result, printed characters do not become obscure.

On the other hand, FIG. 8 illustrates the state of ink jetted from film 74 whose hole diameter is greater than the film thickness.

At the stage of references (1) and (2), bubbles 184 are gradually generated as heating elements 182 are activated. Bubbles 184, in the growth stages of references (3) and (4), break in the center of the liquid surface before bubbles 184 expand to the inner walls of holes 172. Thus, ink drops 186 spread as indicated in the stage of references (5) and (6).

For a film thickness of 5–100 um, it is confirmed that high quality images are obtained when the hole diameter is no more than one-half the film thickness. For smaller diameters, clogging of ink is likely to occur. To the contrary, the amount of ink received in holes 172 becomes small and lower image density results irrespective of diameters when the film thickness is less than 5 um.

It has been found that there is a close relationship between viscosity and boiling point of ink C. Namely, it is required to maintain printing energy at less than 3000 erg/dot, i.e., a value nearly half of the energy needed in a thermal transfer type printer. To meet this requirement, the viscosity must be in the range of 1–5 cp, and also the boiling point must be in the range of 80°–150° C.

In the above embodiments, holes 172 extend through film 74. Holes 172 may alternatively be recesses or concaves to achieve the same purpose.

According to the present invention, a high quality printing may be obtained by providing holes or recesses on the ink carrier film, wherein each of the holes has a diameter less than the film thickness.

Further, holes for receiving ink therein are free from clogging of ink, thereby achieving high ink jet performance.

Numerous modifications and variations of the present invention are possible in light of the above teachings. It is, therefore, to be understood that within the scope of the appended claims, the invention may be practiced otherwise than as specifically described herein.

What is claimed is:

1. A non-impact printing apparatus comprising:

an ink carrier film having a plurality of holes to receive ink therein and the diameter of each of said holes being no more than one-half of the depth of said holes;

means for disposing said ink carrier film opposite to a recording medium; and means for selectively heating said ink carrier film in accordance with an image to be printed so as to eject ink filled in said holes onto said recording medium.

2. A non-impact printing apparatus as in claim 1, wherein said disposing means includes a first rotating member and a second rotating member, said ink carrier film being connected between said first and second rotating members to move said ink carrier film, said first and second rotating members being disposed to hold said ink carrier film against said heating means.

3. A non-impact printing apparatus as claimed in claim 1, wherein said heating means comprises a plurality of selectively activatable heating elements.

4. A non-impact printing apparatus as claimed in claim 1, wherein the diameter of each of said holes provided on said ink carrier film lies in the range of about 15–35 um.

5. An non-impact printing apparatus as claimed in claim 1, wherein the depth of said holes lies in the range of about 5–100 um.

6. A non-impact printing apparatus as in claim 1, wherein said holes extend completely through said ink carrier film so as to force out ink in a straight trajectory.

7. A thermal ink jet printing device comprising:

an elongated thin film having a plurality of holes passed through said thin film, wherein the diameter of each of said holes is no more than one-half of the depth of said holes;

means for disposing said thin film opposite to a recording medium transported in a predetermined direction;

means for filling said holes with ink;

means for selectively heating said thin film in accordance with an image to be printed so as to eject ink carried in said holes onto the recording medium; and means for reciprocating said thin film between said filling means and said heating means.

8. A new use for a film having a plurality of holes wherein the diameter of each of said holes is no more than one-half of the depth of said holes comprising the steps of:

filling said holes with ink; and driving ink from said holes in a straight trajectory with a gas so as to reproduce a visible image.

9. A method of forming an image on a recording medium comprising the steps of:

filling holes in a film with ink, said holes having a width no more than one-half of their depth; and driving ink from said holes to said recording medium in a straight trajectory with a gas so as to reproduce a visible image on said recording medium corresponding to said image.

10. A method as claimed in claim 9, wherein said driving step includes the step of heating ink in selected holes of said film.

11. A thermal ink jet printing device as in claim 7, wherein the diameter of each of said holes provided on said thin film lies in the range of about 15–35 um.

12. A thermal ink printing device as in claim 7, wherein the depth of said holes provided on said thin film lies in the range of about 5–100 um.

13. A thermal ink jet printing device as in claim 7, wherein said holes extend completely through said thin film so as to force out ink in a straight trajectory.

14. An apparatus for reproducing a visible image comprising:

means for disposing a thin film having a plurality of holes passed through said film to a recording medium transported laterally, said holes having a diameter of no more than one-half of their depth;

means for moving said thin film in an opposed relationship with the recording medium;

means for filling said holes with ink; and means for impressing said film upward to said thin film, said impressing means having a plurality of selectively activable heating elements for ejecting ink filled in said holes upward to the recording medium.

* * * * *